US008858145B2

United States Patent
Su et al.

(10) Patent No.: US 8,858,145 B2
(45) Date of Patent: Oct. 14, 2014

(54) FASTENER CAPABLE OF SPEEDILY SCREWING

(71) Applicant: Taiwan Shan Yin International Co., Ltd., Kaohsiung (TW)

(72) Inventors: Kou-Tsair Su, Kaohsiung (TW); Yu-Jung Su, Kaohsiung (TW)

(73) Assignee: Taiwan Shan Yin International Co., Ltd., Kaohsiung (TW)

( * ) Notice: Subject to any disclaimer, the term of this patent is extended or adjusted under 35 U.S.C. 154(b) by 8 days.

(21) Appl. No.: 13/726,928

(22) Filed: Dec. 26, 2012

(65) Prior Publication Data

US 2014/0178149 A1    Jun. 26, 2014

(51) Int. Cl.
*F16B 35/06* (2006.01)
*F16B 19/04* (2006.01)

(52) U.S. Cl.
CPC .................................. *F16B 35/065* (2013.01)
USPC ......................................... 411/399; 411/500

(58) Field of Classification Search
CPC .......... F16B 25/00; F16B 25/02; F16B 25/04; F16B 33/02; F16B 35/04; F16B 35/06; F16B 35/065; F16B 35/048; F16B 33/004; F16B 25/10; F16B 21/086; F16B 19/004; F16B 21/02; F16B 19/02; F16B 19/06
USPC ................................................. 411/399, 500
See application file for complete search history.

(56) References Cited

U.S. PATENT DOCUMENTS

| | | | | |
|---|---|---|---|---|
| 3,825,051 | A | * | 7/1974 | Sigmund ........................ 411/188 |
| 5,183,359 | A | * | 2/1993 | Barth ............................. 411/188 |
| 5,482,418 | A | * | 1/1996 | Giannuzzi ....................... 411/29 |
| 5,772,376 | A | * | 6/1998 | Konig ............................ 411/399 |
| RE36,741 | E | * | 6/2000 | Walther et al. ................. 411/399 |
| 6,676,353 | B1 | * | 1/2004 | Haytayan ....................... 411/442 |
| 6,908,270 | B1 | * | 6/2005 | Iwata ............................. 411/188 |
| 7,293,947 | B2 | * | 11/2007 | Craven ........................ 411/387.2 |
| D593,141 | S | * | 5/2009 | Gaudron ....................... D15/139 |
| 8,146,230 | B2 | * | 4/2012 | Davies et al. .................... 411/82 |
| 8,231,320 | B2 | * | 7/2012 | Hettich ........................ 411/399 |
| 2001/0038781 | A1 | * | 11/2001 | Mallet et al. .................. 411/399 |
| 2005/0063796 | A1 | * | 3/2005 | Dicke ........................... 411/399 |
| 2008/0124187 | A1 | * | 5/2008 | Haytayan ................... 411/387.1 |
| 2009/0123253 | A1 | * | 5/2009 | Hettich ......................... 411/399 |
| 2010/0143070 | A1 | * | 6/2010 | Hettich ......................... 411/399 |
| 2013/0287519 | A1 | * | 10/2013 | Weiss ............................ 411/147 |

* cited by examiner

*Primary Examiner* — Gay Spahn
(74) *Attorney, Agent, or Firm* — Alan Kamrath; Kamrath IP Lawfirm, P.A.

(57) ABSTRACT

A fastener capable of speedily screwing provides a plurality of blocks on a bottom surface of a head and an accommodating area formed between any two adjacent blocks. Each block includes a first wall arranged at one side of the accommodating area and extended upward from the bottom surface, a second wall extending from the first wall to the other side of another adjacent accommodating area, and a cutting edge formed at a convergence of the first wall and the second wall. In screwing, the blocks assist in cutting to achieve a speedy screwing effect, and the accommodating area allows the cutting debris generated accordingly to be received therein to remain a firm engaging force between the fastener and an object. Further, there is no extra cutting debris protruding out of the object after screwing, which increases the flatness, and also enhances the screwing force of the fastener.

2 Claims, 4 Drawing Sheets

FASTENER CAPABLE OF SPEEDILY SCREWING

BACKGROUND OF THE INVENTION

1. Field of the Invention

The present invention relates to a fastener and, particularly, to a fastener capable of speedily screwing.

2. Description of the Related Art

Referring to FIGS. 1 and 2, a conventional countersunk fastener 1 comprises a shank 11, a threaded section 12 spirally arranged on the shank 11, a head 13 connected to one end of the shank 11, and a drilling portion 14 connected to the other end of the shank 11, opposite to the head 13. The head 13 has a top surface 131, a connecting surface 132 connecting the top surface 131 and the shank 11 and shrinking gradually from the top surface 131 to the shank 11, and a plurality of cutting edges 133 equidistantly recessed in the connecting surface 132 by an equal angle. Each cutting edge 133 has two cutting surfaces 134 that are disposed apart and curvedly extended from the top surface to the shank 11. Namely, the cutting edges 133 and the cutting surfaces 134 are concurrently formed into identical curves. In screwing the fastener 1 into an object 2, burrs generated from the threaded section 12 cutting the object 2 travel along the rotating direction of the threaded section 12. Thence, the burrs are guided by the curved cutting edges 133 and the cutting surfaces 134, so that the burrs are pressed into the object 2. Further, the cutting edges 133 and the cutting surfaces 134 are able to flatten the bulge deformed on the object 2 caused by the pressing of the threaded section 12. Moreover, the burrs, bulges, and breakages are preferably avoided. Consequently, after the fastener 1 is driven into the object 2, the surface of the object 2 becomes even.

In practice, the conventional recessions may only be able to accommodate cutting debris in time of screwing. Moreover, the arrangement of the cutting edges 133 is same to the rotating portion of the threaded section 12 while the fastener 1 is driven into the object 2. Therefore, the cutting edges 133 are able to restrain the burrs or the bulges from the object 2. However, the current construction of the fastener still can be improved after practicing. Thus, the present invention is resulted.

SUMMARY OF THE INVENTION

It is therefore the purpose of this invention to provide a fastener capable of speedily screwing into an object for enhancing the flatness of the object and the engaging force between the fastener and the object.

The fastener capable of speedily screwing in accordance with the present invention is characterized in that a plurality of blocks are disposed on the bottom surface, and that an accommodating area is formed between any two of the adjacently disposed blocks. Each block includes a first wall arranged at one side of the accommodating area and extended upward from the bottom surface, a second wall arranged next to the first wall, facing the other side of the accommodating area, and a cutting edge formed at a convergence of the first wall and the second wall. The second wall shrinks gradually from the top surface of the head to the shank, thereby allowing a third wall to be formed adjacent to the second wall and extended from the cutting edge as well as expanded until reaching the other side of the accommodating area that is adjacently disposed. Furthermore, the capacity of the accommodating area is indirectly expanded.

Preferably, the second wall is directed to a cambered surface.

Preferably, a connection portion of the second wall and the third wall is inclined.

Accordingly, the blocks assist the fastener in cutting, so that the fastener is able to enter the object rapidly. Some cutting debris can remain in the accommodating area and be restrained by the third wall to prevent the superfluous cutting debris from protruding out. Therefore, the appearance of the object keeps smooth after screwing. Thus, the object does not have to bear too much cutting debris and result in breakage. Preferably, the fastener can be firmly embedded in the object. Favorably, a firm engaging force between the fastener and the object is achieved.

DETAILED DESCRIPTION OF THE PREFERRED EMBODIMENTS

Figure 1:
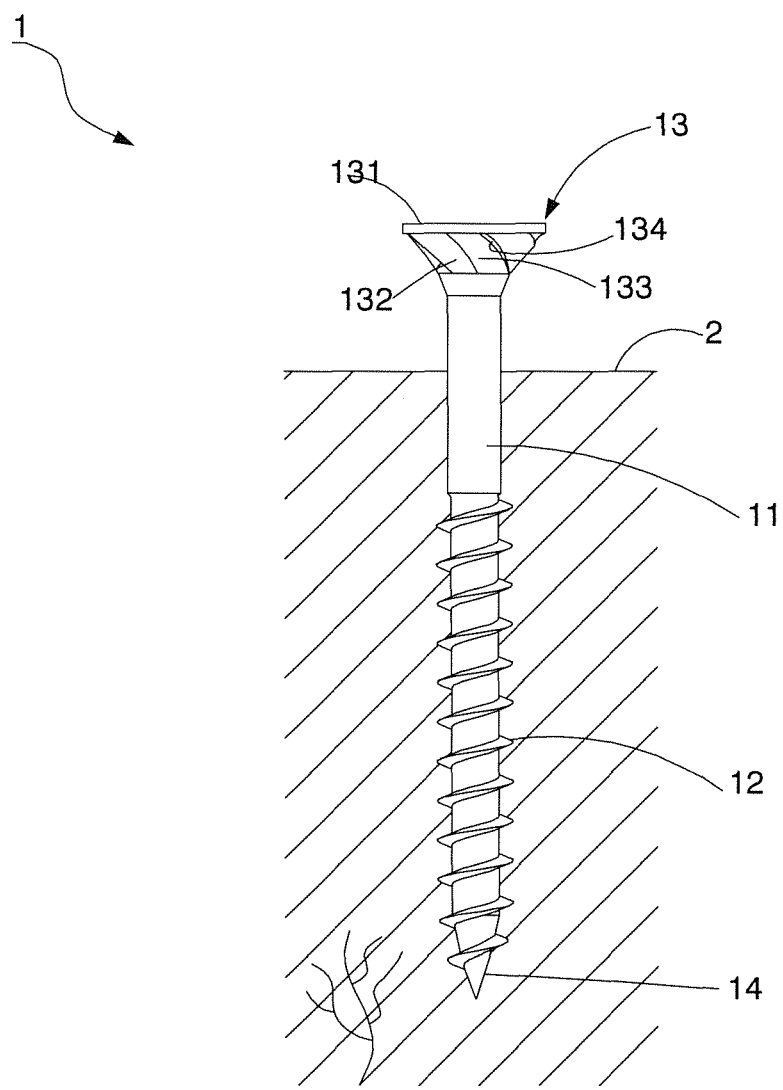
FIG. 1 is a schematic view showing a conventional countersunk fastener.
Figure 2:
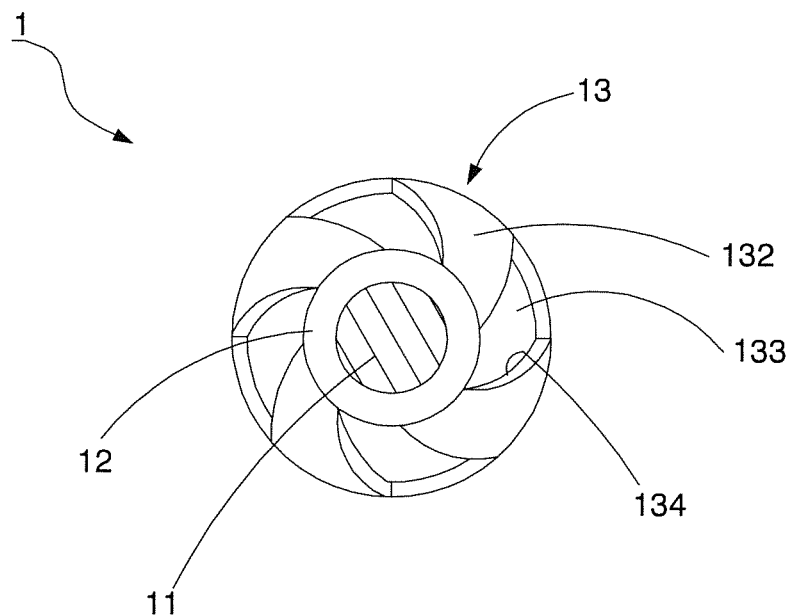
FIG. 2 is a cross-sectional view showing the conventional countersunk fastener.

Wherever possible, the same reference numbers are used in the drawings and the description to refer to the same or like parts.

Figures 3, 4:
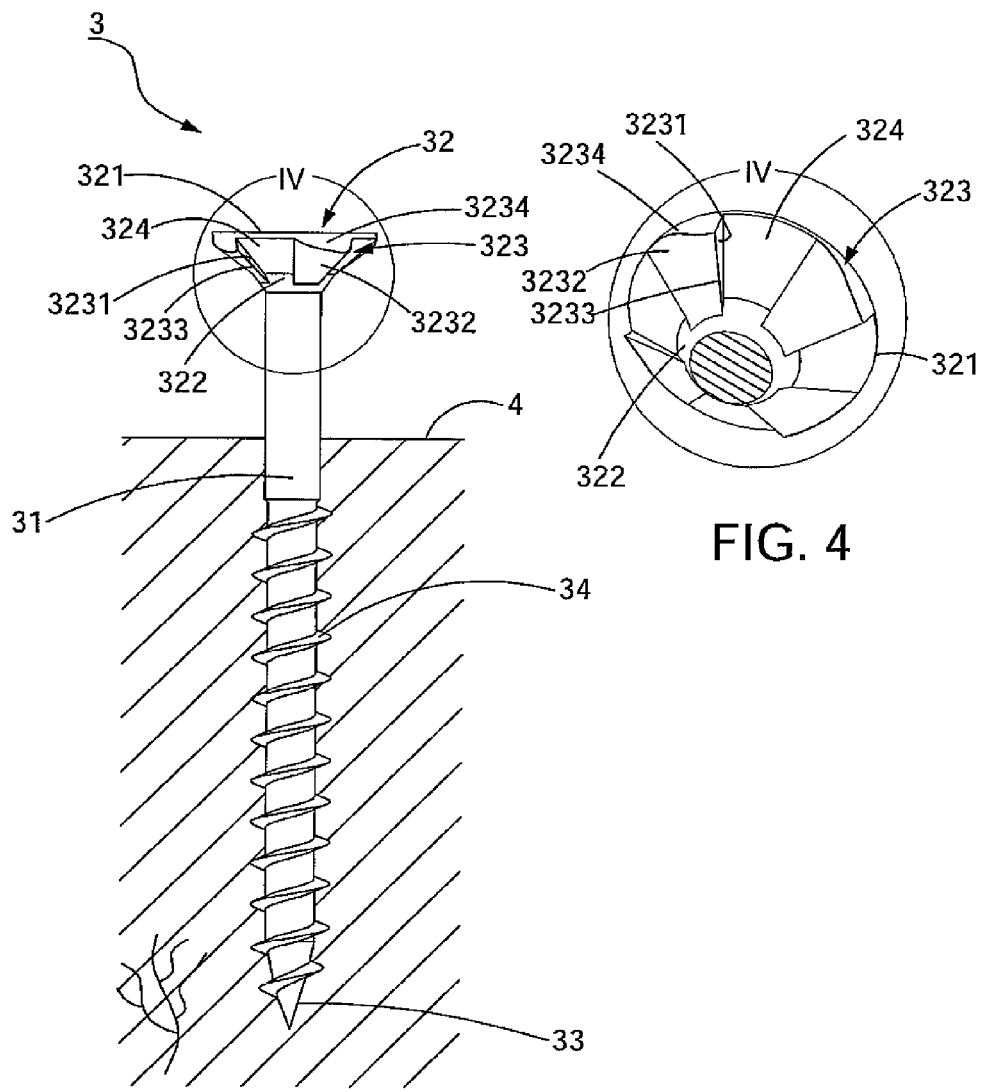
FIG. 3 is a schematic view showing a first preferred embodiment of the present invention.
FIG. 4 is an enlarged schematic view of the encircled area IV of FIG. 3 showing the head of the first preferred embodiment of the present invention.
Figure 5:
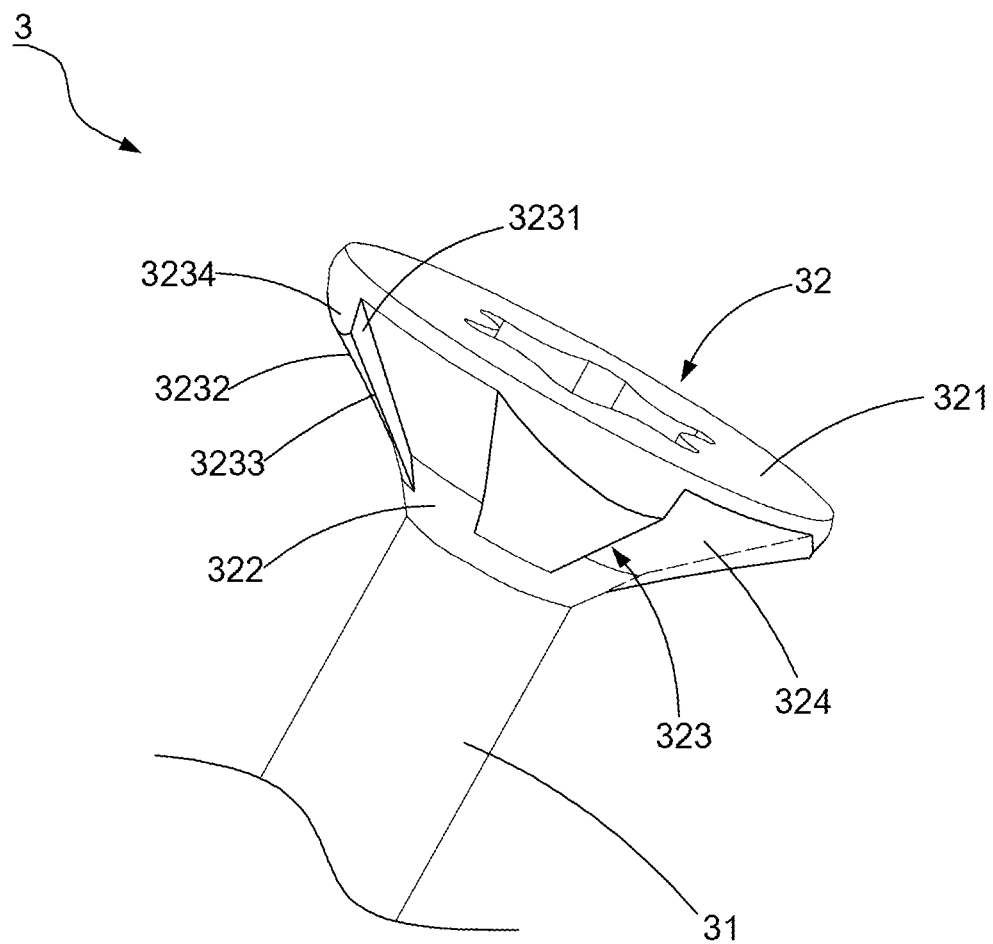
FIG. 5 is a schematic view showing partial elements of the first preferred embodiment of the present invention.

Referring to FIGS. 3 to 5, a first preferred embodiment of the present invention is shown. A fastener 3 capable of speedily screwing comprises a shank 31, a head 32 disposed at one end of the shank 31, a drilling portion 33 disposed at the other end of the shank 31, opposite to the head 32, and a plurality of threads 34 spirally disposed on the shank 31. The drilling portion 33 can be designed into a drill end or a pointed end. In this embodiment, the drilling portion 33 is designed into a pointed end.

Continuingly, the head 32 includes a top surface 321, and a bottom surface 322 extended downward from the top surface 321. A plurality of blocks 323 are disposed on the bottom surface 322, and an accommodating area 324 is formed between any two of the adjacently disposed blocks 323. Each block 323 includes a first wall 3231 arranged at one side of the accommodating area 324 and extended upward from the bottom surface 322, a second wall 3232 arranged next to the first wall 3231, facing the other side of the accommodating area 324, and a cutting edge 3233 formed at a convergence of the first wall 3231 and the second wall 3232. The second wall 3232 shrinks gradually from the top surface 321 to the shank 31, thereby allowing a third wall 3234 to be formed adjacent to the second wall 3232 and extended from the cutting edge 3233 as well as expanded until reaching the other side of the accommodating area 324 that is adjacently disposed. A connection portion of the second wall 3232 and the third wall 3234 is formed inclined. In this embodiment, the second wall 3232 is designed into a cambered surface. The capacity of the accommodating area 324 could be reamed in view of the particular construction of the blocks 323.

Referring to FIGS. 3 and 4, in operation, the head 32 is bestowed by a screwing torque for bringing the drilling portion 33 to enter an object 4. Thereafter, the threads 34 sharply cut out the object 4, so that the fastener 3 enters the object 4 rapidly. When the head 32 enters the object 4, the cutting edges 3233 of the blocks 323 assist in cutting. Namely, the fibers of the object 4 are effectively cut off by the cutting edge 3233 to prevent the resistance generated by the winding of the fibers. Further, the cutting debris generated during screwing can be smoothly expelled from the second wall 3232 out of the third wall 3234 due to the gradually shrinking formation thereof. Preferably, the screwing torque exerted on the fastener 3 is decreased. While the superfluous cutting debris can be received in the accommodating area 324 that is reamed, the engaging force between the fastener 3 and the object 4 is largely improved, so that the breakage resulting from the cutting debris unable to be completely accommodated can be prevented. Further, when the connection portion of the second wall 3232 and the third wall 3234 is designed inclined, the cutting debris protruding out of the object 4 is now restrained in the object 4 by the third wall 3234 after screwing to prevent too much cutting debris from protruding out of the object 4. Preferably, the appearance of the object 4 is smooth. Favorably, the fastener 3 and the object 4 are firmly engaged with each other, and the screwing force of the fastener 3 is obviously enhanced.

To sum up, the present invention particularly utilizes the blocks disposed on the bottom surface of the head and the accommodating area formed between any two of the blocks to enhance the rapid screwing. Namely, in screwing, the blocks help with cutting, and the accommodating area assists in accommodating the cutting debris, so that the fastener is able to provide a firm engaging force between the fastener and the object. While the cutting debris generated during screwing is prevented from protruding out of the object, a flat appearance of the object and a solid screwing effect are both achievable.

While the embodiments in accordance with the present invention are shown and described, it should be clear to those skilled in the art that further embodiments may be made without departing from the scope of the present invention.

We claim:

1. A fastener capable of speedily screwing comprising:
a shank, with a head disposed at one end of said shank, with a drilling portion disposed at another end of said shank opposite to said head, and with a plurality of threads spirally disposed on said shank;
with said head including a top surface and a bottom surface extended downward from said top surface;
wherein a plurality of blocks is disposed on said bottom surface, wherein an accommodating area is formed between any two adjacent blocks; with each block including a first wall arranged at one side of said accommodating area and extended upward from said bottom surface, a second wall extending from said first wall to another side of another adjacent accommodating area, and a cutting edge formed at a convergence of said first wall and said second wall; with said second wall tapering gradually from said top surface to said shank, with a third wall formed on said second wall and extended from said cutting edge to reach said other side of said other adjacent accommodating area;
wherein each accommodating area defines a surface disposed between a pair of said blocks extending radially outward in a sloped manner to a periphery of said top surface, and wherein said second wall is directed to a cambered surface.

2. The fastener as claimed in claim 1, wherein a connection portion of said second wall and said third wall is inclined.

* * * * *